June 2, 1942.  A. O. WILLIAMS  2,285,134
BRAKE
Filed Dec. 28, 1939  5 Sheets-Sheet 3

INVENTOR.
ALFRED O. WILLIAMS.
BY Walter E. Schinner
ATTORNEY.

June 2, 1942.   A. O. WILLIAMS   2,285,134
BRAKE
Filed Dec. 28, 1939   5 Sheets-Sheet 4

INVENTOR.
ALFRED O. WILLIAMS.
BY Walter E. Schurmer
ATTORNEY.

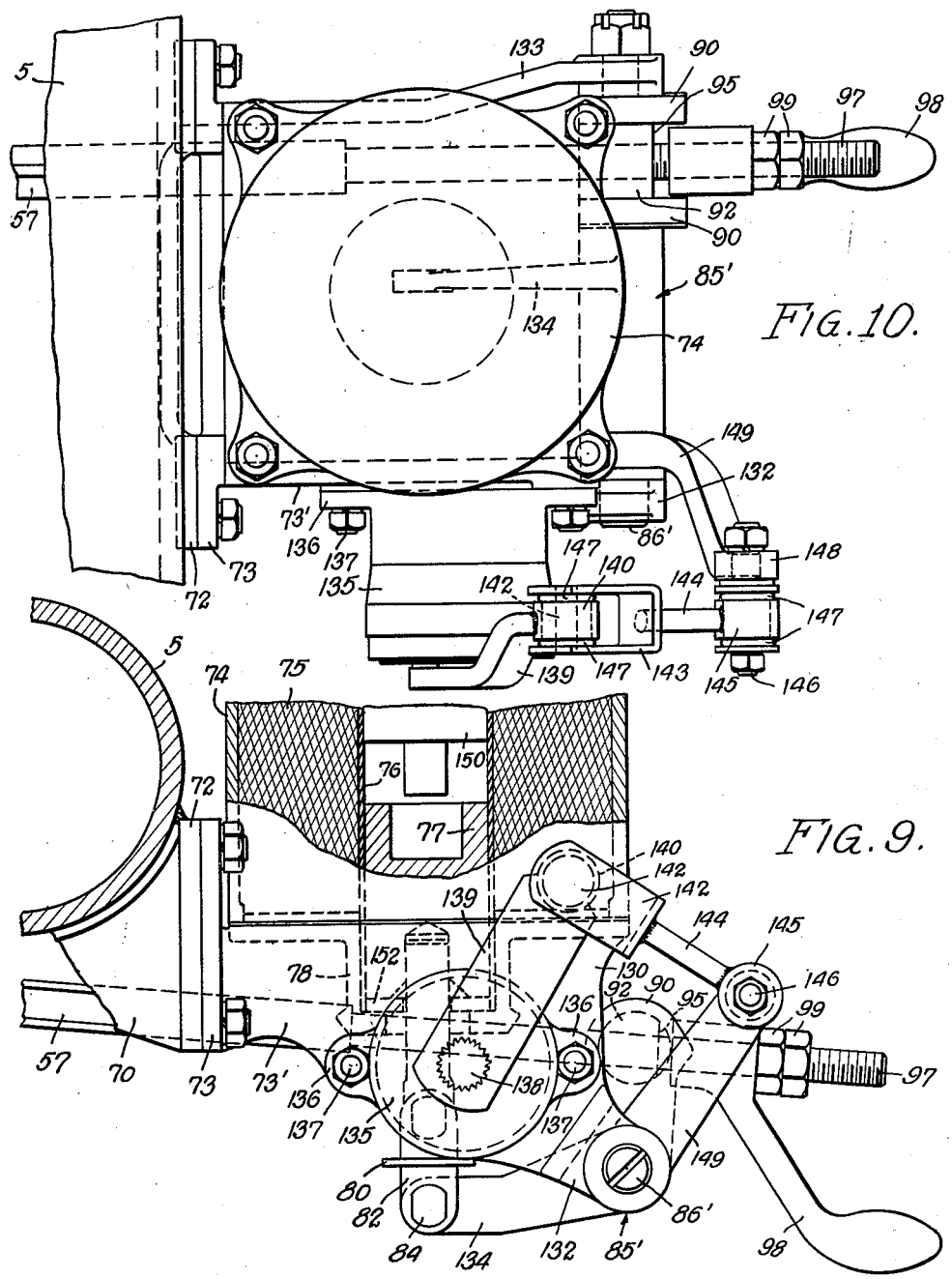

Patented June 2, 1942

2,285,134

UNITED STATES PATENT OFFICE 2,285,134

BRAKE

Alfred O. Williams, Battle Creek, Mich., assignor to Clark Equipment Company, Buchanan, Mich., a corporation of Michigan Application December 28, 1939, Serial No. 311,282

24 Claims. (Cl. 188—75)

This invention relates to brakes, and more particularly is directed to motor shaft brakes adapted for use in connection with electric motors, or similar driving or prime movers adapted for use in rail car trucks or the like. The present braking system is intended to provide for proper braking of such rail vehicles without the necessity of having power applied shoe brakes for engagement with the wheel treads, as such latter type of brake is subject to considerable wear and results in an appreciable amount of added weight in the vehicle.

In its preferred embodiment, the present invention contemplates the provision of a brake drum on the motor shaft with braking means associated with this drum and adapted to be automatically actuated either pneumatically or electrically for braking the engine. The construction is so designed that the brakes are normally held in released position by means of an electric current or compressed air, and de-energization of the electric circuit or release of the compressed air will cause the brakes to be applied through the medium of springs of sufficient size and capacity to effect the braking action.

Another object of the present invention is to provide a construction in which adjustment of the brakes can be readily controlled from a point externally of the car truck and accessible from the side of the vehicle under which the truck is mounted.

Still another feature of the present invention is the provision of simplified means for supporting the brake applying and releasing mechanism from the side frame member of the truck with the parts in such position that they may be readily inspected and serviced without requiring removal of the car body, or the use of pits or the like.

Still another feature of the present invention is the provision of a novel type of linkage for controlling the brakes from the power cylinder, this linkage mechanism being associated directly with the adjusting mechanism, and including shock absorbing means for cushioning the violent action of the solenoid.

Still another advantage of the present invention is its simplification of design and construction so that the parts may be economically manufactured, may be readily assembled and connected without requiring special machinery or the like and without requiring any modification of the car truck or the motor mounting in such truck.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 9 is an elevational view, partly in section, showing the cushioning means for the solenoid; and Figure 10 is a top plan view of Figure 9.

Figure 7:
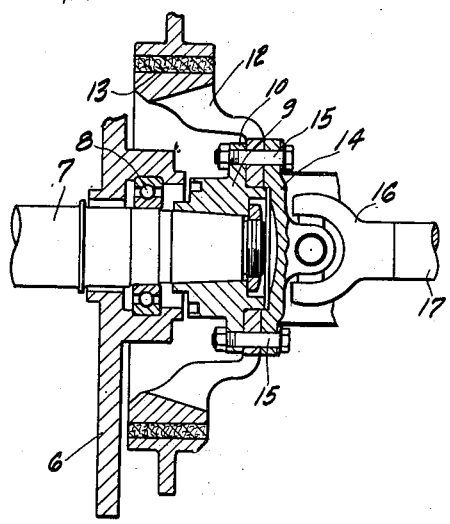
Figure 7 is a sectional view taken substantially on line 7—7 of Figure 1.

Referring now in detail to the drawings, the present braking construction has been illustrated as applied to what is known as the P. C. C. truck, which truck has resulted from the engineering activities of a number of street railway companies, and has been put into extensive use under street cars in various of the larger cities in this country. The general appearance of such a truck is shown in design patent No. 116,112, issued August 8, 1939 to Robert J. Burrows et al., and includes the provision of side frame members comprising tubular longitudinally extending frames 5 upon which is supported the transversely extending frame members which in turn form cradle supports for electric motors connected to the driving axles. These motors are spaced in laterally offset relation and in longitudinally spaced relation within the truck, and are mounted on transverse cradle members welded or otherwise secured to the side frame members 5, as disclosed in detail in my Patent No. 2,167,164, issued July 25, 1939. The end plates of the motors are shown diagrammatically at 6 in Figure 7, and the motor shafts 7 project outwardly therefrom and are journalled in suitable bearings 8 carried by the end plates.

Mounted on the projecting end of the shaft 7 is a hub 9 which is splined or otherwise secured thereto and provided with the annular flange 10 to which is bolted the brake drum member 12, this member being in the form of a spider having an axially offset brake drum surface 13 which radially overlies the bearing 8. Also secured to the flange 10 is a universal joint flange 14, through bolts 15 being employed to secure all of these parts in fixed position on the hub 9. A second universal joint companion flange 16 is secured to the universal joint flange 14, and, through the propeller shaft 17 connects the motor to the pinion gear which drives the truck axle.

The end plate 6 of the motor is provided at one side thereof with an integrally formed boss portion 18 which forms an anchoring means for supporting the brake shoes, indicated respectively at 19 and 20, in position. The anchoring means 18 includes a pair of projecting studs 22 which are adapted to clamp a resilient flat spring-like member 23 to the projection 18, suitable feather springs 24 being disposed on each side of the main spring 23. At its outer extremities the main spring 23 is provided with laterally serrated surfaces 25, and the brake shoes are provided with correspondingly serrated surfaces in the ends 26 thereof. The brake shoes are supported in position by means of clamping studs 27 which lock the serrated surfaces together, it being noted that the outer ends of the spring 23 are slotted or bifurcated so that the studs 27 may move longitudinally therein to accommodate adjustment of the brake shoes toward or away from the anchor means.

The arcuate portions of the brake shoes 19 and 20 are of substantially T-shaped section, and are provided on their inner surfaces with the brake linings 28, which are adapted to engage the surface 13 of the brake drum 12. The end of the brake shoe 19, remote from its support on the spring member 23, is extended in a substantially radial direction, as indicated at 29, and is provided with a recessed pocket 30 through which extends the brake shaft 32. At the extremity of the end 29 of the shoe 19, the under surface of this projecting portion is provided with a wear pad 33 riveted or otherwise suitably secured thereto, which is adapted to be engaged by the roller actuating mechanism to be described in detail hereinafter.

The corresponding end of the shoe 20 is also provided with an extension 34 carrying a corresponding wear pad 35 and having a suitable aperture through which the opposite end of the brake shaft 32 extends. The shaft 32 at its lower end is threaded, as indicated at 36, to receive an adjusting nut 37 which bears against a suitable bushing 38 upon which one end of the brake spring 39 is seated. The opposite end of the spring 39 is biased against the sleeve member 40 which bears against the projecting portion 34 of the brake shoe 20. Similarly, the upper end of the brake shaft 32 has disposed thereabout the spring 42 which seats at one end in the base of the pocket 30 and at its opposite end bears against the flanged sleeve 43 slidable axially of the shaft 32 and normally locked in position by means of a key member 44 which has a bifurcated end adapted to slide in a groove in the upper end of the shaft 32, as shown more clearly in Figure 2, to lock the bushing 43 against movement outwardly of the end of the shaft. A suitable detent 45 is provided to insure that the key 44 will stay in position, and the key is preferably apertured, as indicated at 46, so that it may be reached by means of a hooked lever for withdrawal from the side of the car body. It will be noted that by threading the nut 37 axially on the shaft 32, the pressure of the springs 39 and 42 can be adjusted so as to determine the pressure of the brake lining on the brake drum produced when the brake shoes are released for actuation by the springs. This adjustment is desired to insure proper braking rate for the vehicle, since this braking rate is a direct function of the speed of rotation of the brake drum 13.

Figure 2:
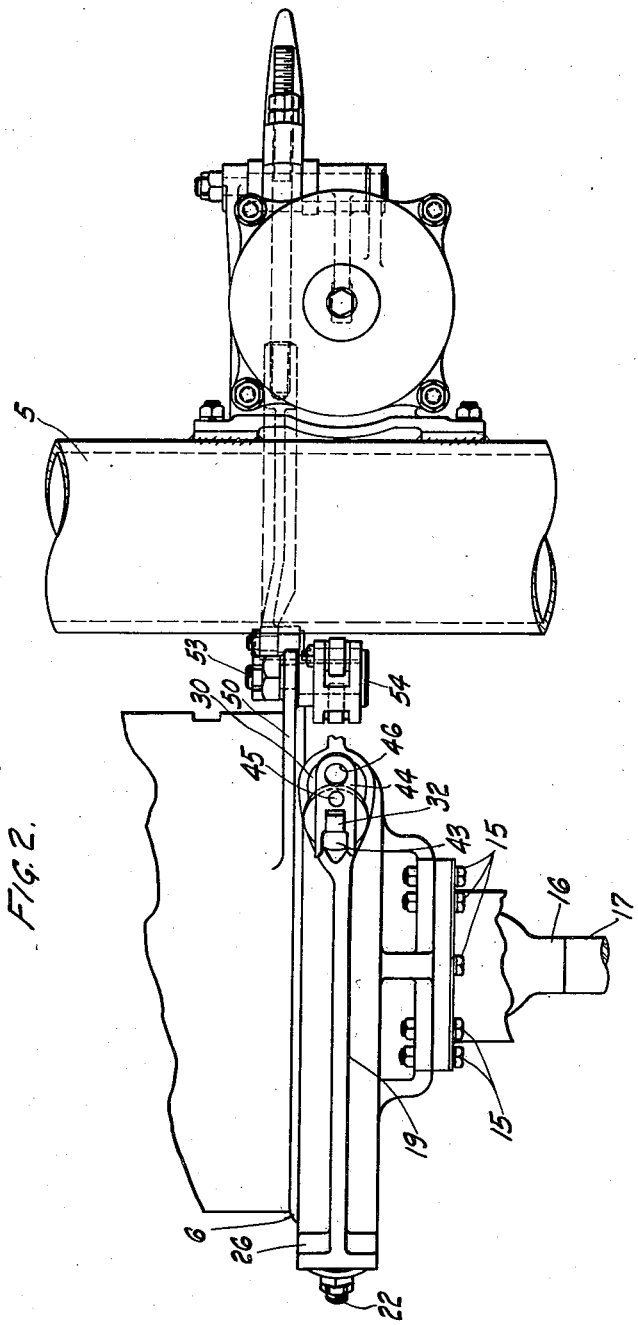
Figure 2 is a plan view of the construction shown in Figure 1.

The end plate 6 of the motor opposite the extension 18 which provides the anchor for the stationary ends of the brake shoes is provided with a laterally projecting web portion 50 which, as clearly shown in Figure 2, provides a support for the pivot stud 53 which is secured therein and which extends normally thereto having the head end 54 locking the T-shaped lever 55 in position for rotation about the pin 53 on the outer face of the plate 6. The lever 55 has an extending portion terminating at its end in a pivotal portion engaging the pivot pin 56, this pin also serving to receive the operating lever 57 connected to the brake control mechanism. The depending arm portion of the lever 55 is axially offset from the bifurcated opposite extending roller supporting portions 58 and 59, which portions are adapted to receive pins 60 and 62 for pivotally supporting the rollers 63 thereon.

Figure 6:
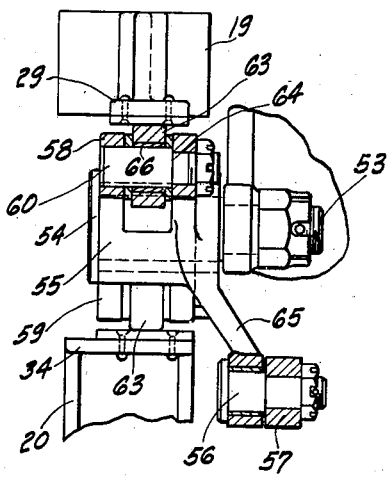
Figure 6 is a sectional view taken substantially on line 6—6 of Figure 1.

The details of this lever construction are shown more clearly in Figure 6, to which reference will now be made. It will be noted that the studs 60 which support the rollers 63 are held against axial movement by the reduced shouldered portion 64 and by engagement with the enlarged flanged end 54 of the pivot pin 53. It will also be seen that the depending portion of the lever 55, indicated at 65, is laterally offset out of the plane of the brake shoes 19 and 20, and is so disposed that it may be freely rotated about the pin 53 without interference with the brake shoes. The rollers 63 are preferably carried by suitable thrust washers on opposite faces thereof, and are journalled upon a suitable bearing or bushing 66, thereby allowing the rollers 63 to freely rotate relative to the pins 60 and 62 so that as the lever 55 is rotated under the influence of the actuating lever 57, the arms 58 and 59 rotate in a counter-clockwise direction resulting in forcing the ends 29 and 34 of the brake shoes apart against the pressure of springs 39 and 42. The brake, as shown in Figures 1 and 2, is in brake-applying position with the linings 27 and 28 engaging the drum 13 and the rollers 63 exerting no force against the wear plates 33 and 35.

Secured to the under surface of the frame member 5 and projecting laterally outwardly therefrom is a bracket or supporting member 70 which is preferably welded to the side frame member 5, and which is provided with a vertically extending face portion 72 adapted to receive the bracket 73 upon which is supported the cylinder 74 carrying the brake control mechanism. In the embodiment of the invention shown in Figures 1 and 2, the housing 74 is adapted to contain an electric current or solenoid winding 75 with a central opening 76 in which the armature 77 is adapted to move. At its lower end the housing 74 is provided with a depending portion 78 to which is secured a suitable flexible boot or cap member 79 which, at its free end, is secured to the flange portion 80 of a pair of links 82, which links are pivotally connected at one end to the armature 77 by means of the stud 83 and at the opposite end are connected through the pin 84 to the bell crank lever 85. The lever 85 is pivotally supported upon the shaft 86 carried by depending arms 87 formed integral with the bracket plate 73. The lever 85 has a hub portion 88 which extends substantially the full distance between the arms 87 encircling the shaft 86 and being rotatable thereabout. The arm portion 89 of the lever extends downwardly and forwardly, as shown in Figure 1 for connection through the pin 84 to the links 82. Laterally offset from the arm portion 89, the lever is provided with the angularly extending forked arm portion 90 adapted to receive the cylindrical member 92 therebetween, this member being rotatably journalled between the arms 90 and secured in position by means of the washers 93 secured in the ends of the member 92 by the screws 94. Intermediate the arm portions 90 the cylinder member 92 is provided with a flatted surface 95 through which extends the opening 96 adapted to receive the rod 97 which extends therethrough, and at its forward end, is rigidly secured to the rear end of the actuating lever 57 to form rigid connection therewith. On the threaded end of the rod 97 there is provided an adjusting lever 98 which can be rotated about the rod 97 for axial movement therealong, and which is held in its desired adjusted position by means of a pair of lock or jam nuts 99.

Figure 1:
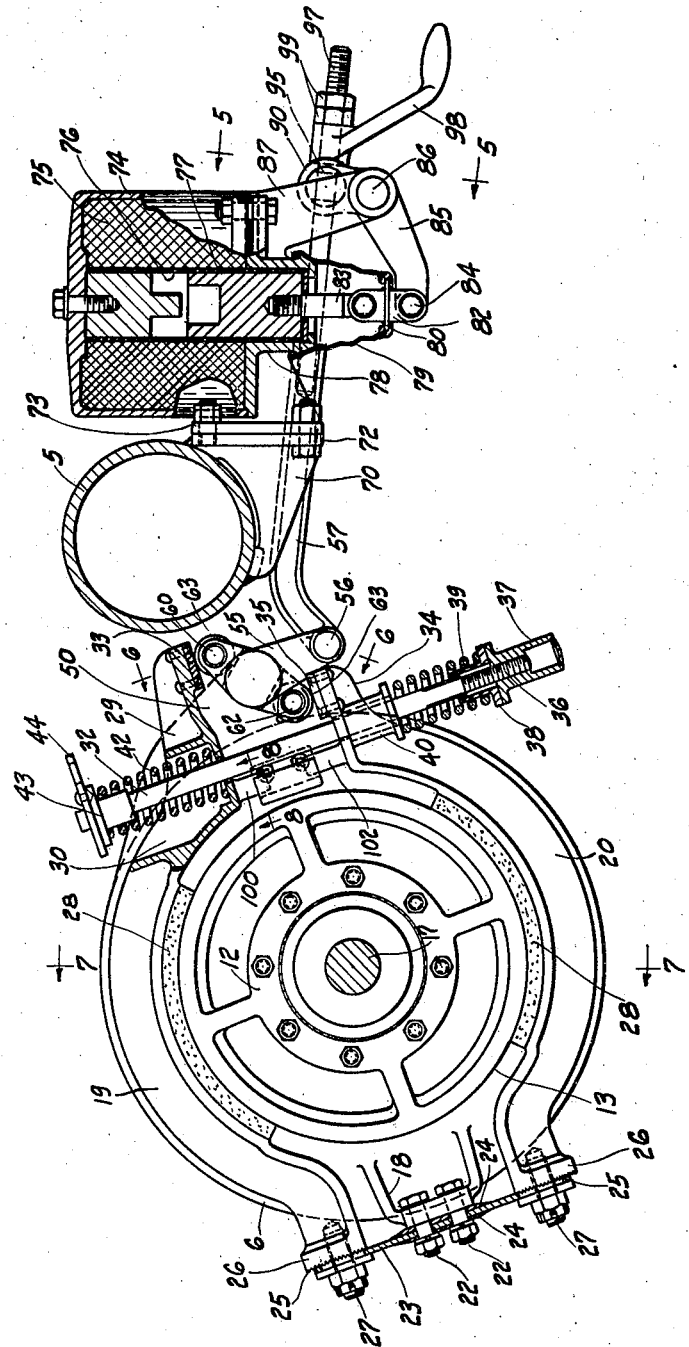
Figure 1 is an end elevational view partly in section of an electrically controlled brake embodying the present invention.

With the mechanism as shown in Figure 1, in which the brakes are in applied position, there is clearance between the flatted portion 95 of the member 92 and the forward end of the adjusting lever 98. This clearance is required in order that the springs 39 and 42 be fully effective to exert their entire pressure on the brake shoes for actuating the same. When the brakes are to be released, the coil 75 is energized which raises the armature 77 upwardly, pulling the lever 85 in a clockwise direction about the pivot 86. This results in the flatted portion 95 of the member 92 moving rearwardly to engage the forward end of the adjusting lever 98, and as the armature 77 moves upwardly, the engagement between the surface 95 and the lever 98 results in moving the rod 97 to the right, as viewed in Figure 1. This in turn results in tensioning the actuating lever 57 to rotate the T-shaped lever 55 in counter-clockwise direction about the pivot 53. This rotation results in pressure engagement of the rollers 63 with the wear plates 33 and 35, spreading the shoes apart against the pressure of springs 39 and 42 and also exerting a certain amount of flexing on the anchoring strut 23. This results in the shoe linings 27 and 28 being moved away from the brake drum surface 13, thereby releasing the drum, and consequently, the motor shaft from any braking action. So long as current is maintained in the coil 75, the armature is held in its uppermost position and the brake shoes are maintained in brake releasing position. However, upon de-energization of the coil 75 the springs 39 and 42 immediately cam the lever 55 in a clockwise direction, pulling the actuating lever 57 and consequently the rod 97 forwardly. This motion is permitted inasmuch as the armature 77 has at this time dropped by gravity and has therefore moved the lever 85 in a counterclockwise direction to release any engagement between the member 92 and the adjusting lever. As a result, the springs 39 and 42 are free to force the brake shoes against the drum to provide effective braking thereof. In this connection, it should be noted that the angle between the pivot arms 58 and 59 of the lever 55 and the direction of movement of the wear plates 33 and 35 is such that the resultant force produces rotation of the lever, and that at no time would the lever be capable of wedging between the two brake shoes to prevent their closing, inasmuch as the rollers are offset on opposite sides of the pin 53 and never pass into an alined position with respect to a plane through the pin axis normal to the movement of the shoes.

Figure 8:
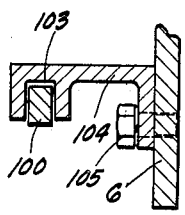
Figure 8 is a detailed sectional view taken substantially on line 8—8 of Figure 1.

In order to maintain the shoes 19 and 20 against angular movement out of the plane of the brake drum 12, each of the shoe ends 29 and 34 is provided with an extending lug portion, indicated at 100 and 102, respectively. These lug portions are engaged in a suitable channel, indicated more in detail in Figure 8 by reference numeral 103, formed in a bracket member 104 bolted or otherwise suitably secured to the plate 6 of the motor by means of the screws or bolts 105. This member is of sufficient extent so that the lugs 100 and 102 are engaged therein throughout any normal movement of the shoes, and consequently maintain the shoes in planar alinement during movement with respect to the plane of the brake drum 12.

Figure 3:
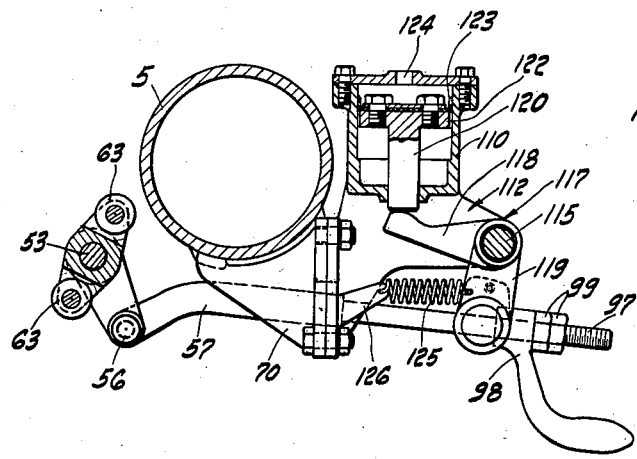
Figure 3 is a partial elevational view showing a modified form of pneumatic control means adapted for operation with the braking system of Figure 1.
Figure 4:
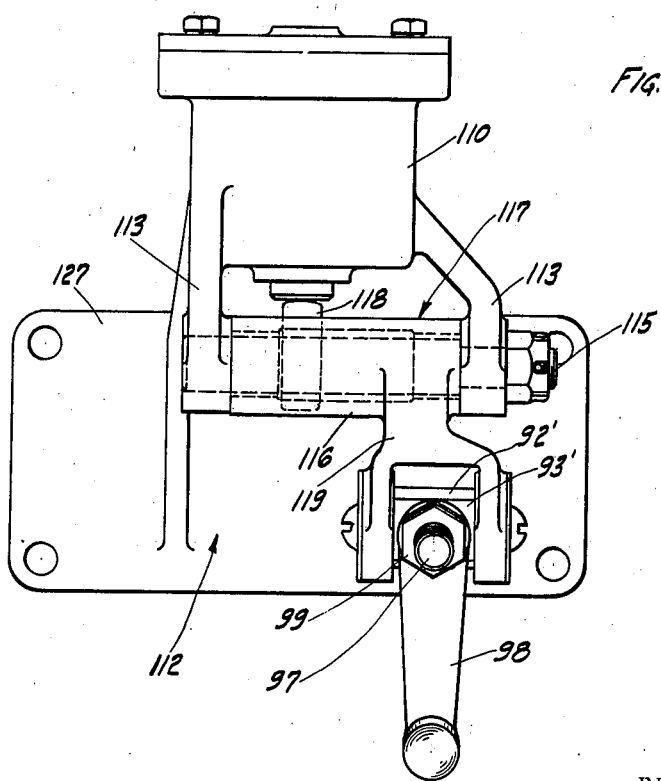
Figure 4 is an end elevational view of the structure shown in Figure 3.

Considering now the form of the invention shown in Figures 3 and 4, it is to be noted that the brake mechanism per se is identical with that described in the embodiment of the invention shown in Figures 1 and 2, and the only variation resides in the actuating mechanism for controlling the operation of the brakes.

Figure 5:
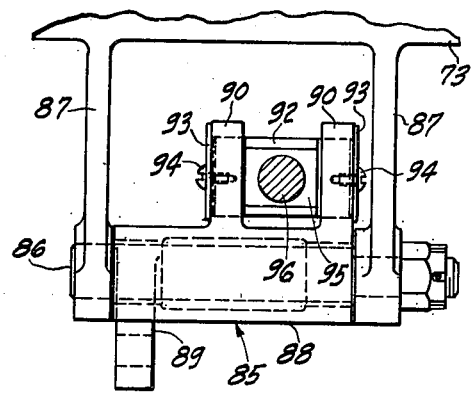
Figure 5 is a fragmentary end elevation of the cylinder arm support shown in Figures 1 and 2.

In Figures 3 and 4, this actuating mechanism comprises an air cylinder 110, which cylinder is mounted on a suitable bracket 112 secured to the face of the bracket 70 welded to the side frame member 5. The bracket 112 has depending arm portions 113 between which is journalled a pivot pin 115, this pin corresponding to the pin 86 of Figure 1. The pivot pin 115 is adapted to carry thereon the hub portion 116 of a bell crank lever indicated generally at 117, and comprising the angularly extending arm portions 118 and 119. The arm portion 118 at its free end is adapted to engage the outer projecting end of the plunger or piston 120 carried in the air cylinder 110, the piston being indicated in its entirety at 122 and having the sealing ring 123 at the upper end thereof. The piston, under normal operating conditions of the vehicle, is moved downwardly in the cylinder 110 by air pressure entering through the port 124, and thereby tends to rotate the lever 117 in a counter-clockwise direction. This results in moving the opposite arm portion 119 against the adjusting handle 98 carried by the rod 97 secured to the actuating lever 57. The arm portion 119 is bifurcated to carry the cylindrical member 92' corresponding to the member 92 of Figure 5, which has the flatted portion 93' engaging the adjusting handle. The member 92' is retained in position in the same manner as described in connection with the member 92 of Figure 5.

Suitable spring means 125 is connected between the arm 119 and a lug portion 126 carried on the base portion 127 of the bracket 112, which normally tends to move the lever 117 in a clockwise direction so that whenever the air pressure is released above the piston 122, the spring will move the piston upwardly in the cylinder 110 through the action of the bell crank lever. This moves the member 92' away from the adjusting handle 98, and due to the pressure of the springs 39 and 42, the actuating lever 57, as well as the lever 55, are rotated under the pressure of these springs to allow the brake shoes to move into brake applying position. When the air pressure is again imposed upon the piston 122, the lever 117 is rotated to move the rod 97 and consequently, the actuating lever to the right, thereby engaging the rollers 63 with the wear plates on the brake shoes to spread the brake shoes apart to brake releasing position against the pressure of the brake springs.

It will thus be apparent that with either embodiment of the invention, so long as normal operating conditions are obtained in the vehicle, the brakes will be in released position due to the actuation of the plunger 120 against lever 117 or the armature 77 against lever 85. However, upon cutting off of the electric current or reduction of the air pressure, these mechanisms will be released to allow the brakes to be spring applied for stopping the motor. Thus, a spring applied brake system is provided which will automatically set the brakes upon failure of power or air pressure in the car, and will not allow the brakes to be released until such time as conditions have become normal.

In Figures 9 and 10 there is shown a modification of the structure shown in Figures 1 and 2 in which shock absorbing or cushioning means is mounted on the solenoid bracket and connected to the bell crank controlled by the solenoid for restraining the violent action of the solenoid in moving to brake releasing position.

It has been found in testing this mechanism that objectionable noise is produced by reason of the armature 77 slamming upwardly against the metal stop in the solenoid core. For this reason I have developed a shock absorbing means which cushions the latter part of the movement of the armature to prevent this objectionable noise.

Referring now in detail to Figures 9 and 10 it will be noted that the bracket 70 is secured to the side frame tube 5, and in turn has secured thereto the solenoid supporting bracket 73' corresponding to the bracket 73 shown in Figure 1. Various other parts of the mechanism corresponding to those shown in Figure 1 have been supplied with corresponding numerals.

The bracket 73' is provided with a face plate portion 130 which has the depending offset shoulder portion 132 on one side thereof and the arm portion 133 on the opposite side forming a journal support for the cross pin 86' upon which the bell crank 85' is pivoted. This bell crank is provided with the arm portion 134 which is connected through the pin 84 to the armature 77 of the solenoid. Another arm portion of the bell crank comprises the bifurcated arms 90 between which is pivotally mounted the sleeve 92 having the flatted surface 95 against which the end of the adjusting handle 98 abuts when the armature is actuated to move the actuating rod 57 toward brake spreading position.

Mounted on the face portion 130 of the bracket 73' is a shock absorber indicated generally at 135 having extending ear portions 136 which are secured by means of the bolts 137 to the face portion 130.

The shock absorber may be of the conventional automotive type hydraulically controlled, and is provided with the substantially axially extending arm or shaft 138 having a serrated surface over which is secured the control arm 139. The control arm 139 at its upper end is provided with the collar portion 140 which is pivotally mounted on the pin 142 carried in the bifurcated end of a clevis 143 having the arm portion 144 provided with the collar 145 rotatably mounted on the pin 146. Both the arm 139 and the arm portion 144 are cushioned by means of rubber bushings 147 to prevent any possible rattling or the like with respect to the pin and the confining stops on the pins.

Also pivotally secured to the pin 146 is the end 148 of an angularly offset arm 149 formed integral with the bell crank 85' and extending in a laterally offset position beyond the journal 132 to engage the pin 146. This, in effect, forms a parallelogram linkage between the operating shaft 138 of the shock absorber and the bell crank pivot 86' through the arms 139 and 149 and the cross connecting member 143 connected between the pins 142 and 146.

It will be apparent that upon actuation of the solenoid coil 74 the armature 77 will be attracted upwardly, thereby producing actuation of the link 82 resulting in rotating the arm portion 134 of the bell crank in a clockwise direction. This forces the sleeve 92 against the control member 98 to thereby urge the rod 57 to the left, causing spreading of the brake shoes. However, as the armature 77 moves upwardly, the arm portion 149 of the bell crank also rotates in a clockwise direction, and through the arm 143 rotates the operating arm 139 of the shock absorber in a corresponding clockwise direction. As the shock absorber is thus moved, it cushions rapid movement of the armature 77 near the end of its travel. The amount of travel required in the armature 77 is such that the arm 149 of the bell crank moves through an arc of approximately 18 degrees, and a substantially corresponding arcuate movement is produced in the arm 139. By proper setting of the shock absorber, it functions to resist the movement of the bell crank during the last few degrees of travel, thereby preventing the armature 77 from slamming up against the stop 150 in the solenoid core, and thus eliminates any noise in the operation of the mechanism.

It is to be understood that this shock absorbing means can be mounted on the structure shown in Figures 1 and 2, and if desired, can also be incorporated in the embodiment of invention shown in Figures 3 and 4. However, in this last embodiment of the invention, suitable valves or metering orifices may be provided to produce the same cushioning effect since air pressure is employed for the operation of the mechanism.

It is of course to be understood that the shock-absorber mounting might be varied somewhat from the particular arrangement described and illustrated, although I have found that this is a most satisfactory operating arrangement. The main function of the device is to insure that the armature will not slam against the stop in the solenoid core upon energization of the solenoid. Downward movement of the solenoid upon de-energization of the coil under the influence of the brake springs will not necessarily have to be cushioned as a rubber washer, such as indicated at 152, may be placed in the bottom of the coil so that the lower end of the armature will engage therewith and be automatically cushioned when it drops by gravity.

I am aware that various changes may be made in certain of the details of the construction herein shown and described, and I therefore do not intend to be limited except as defined by the scope and spirit of the appended claims.

I claim:

1. A brake for a motor shaft comprising a brake drum on said shaft, a pair of brake shoes anchored on one side of said drum and having parallel extensions on the other side, spring means normally urging said shoes into engagement with said drums, a lever pivoted intermediate said extensions and having opposed arm means engaging the same for spreading said shoes apart against the pressure of said spring means, a second lever connected at one end to said first lever, an actuating means, a bell crank controlled by said actuating means for engaging said second lever adjacent its opposite end for shifting it longitudinally to rotate said first lever for spreading said shoes, and a lost motion connection between said bell crank and said second lever.

2. In a rail car truck having a frame member, a motor disposed on one side thereof having a shaft, a brake drum on said shaft, an end plate for said motor having an offset boss, a leaf spring secured intermediate its ends to said boss, arcuate brake shoes having adjacent ends thereof clamped to said spring ends to anchor said shoes, the opposite ends of said shoes having parallel spaced extensions, said plate having an extending portion provided with a pivot pin intermediate said extensions, and a T-shaped lever pivoted on said pin and having arm portions engaging said extensions, and actuating means on the opposite side of said frame member for rotating said lever to spread said shoes away from said drum.

3. The combination of claim 2 further characterized by spring means bearing against said extensions and normally urging said shoes into engagement with said drum.

4. A brake construction for a motor shaft having a brake drum keyed thereon adjacent one end plate of the motor, comprising a laterally offset boss on said plate outwardly of said drum, a leaf spring supported intermediate its ends on said boss, a pair of arcuate brake shoes overlying said drum and each having one end thereof turned outwardly and clamped to an end of said spring, a brake shaft extending through the opposite ends of said shoes, and spring means on said shaft normally urging said shoes against said drum.

5. The construction of claim 4 further characterized in the provision of means for varying the clamped position of said shoes on said leaf spring.

6. The construction of claim 4 further characterized in the provision of means on said brake shaft for varying the effective pressure of said spring means.

7. The construction of claim 4 further characterized in the provision of quick detachable key means on one end of said brake shaft for releasing said spring means and allowing removal of said shaft from said shoes.

8. The construction of claim 4 further characterized in the provision of pivotally mounted means between said opposite ends of said shoes operable upon rotation for spreading said shoes apart against the pressure of said spring means, and slotted ends on said spring having face serrations, and means for adjustably clamping said associated ends of said shoes in selected position on said spring ends.

9. A brake construction for a shaft having a brake drum thereon, comprising an anchor member having a leaf spring secured intermediate its ends thereto, a pair of arcuate brake shoes having corresponding ends thereof resiliently anchored to the ends of said spring, the opposite ends of said shoes having parallel lateral extensions of unequal length, spring means engaging said extensions and normally urging said shoes against said drum, and means pivotally mounted between said extensions and having spaced rollers engaging the ends thereof for spreading said shoes apart.

10. A brake construction for a shaft having a brake drum thereon, comprising a pair of arcuate brake shoes having corresponding ends thereof resiliently anchored in position, the opposite ends of said shoes having parallel lateral extensions of unequal length, spring means engaging said extensions and normally urging said shoes against said drum, means pivotally mounted between said extensions and having spaced rollers engaging the ends thereof for spreading said shoes apart, said shoe extensions being provided with projecting lugs, and channel means positioned intermediate said extensions receiving said lugs preventing displacement of said shoes out of the plane of said drum.

11. Brake means for a shaft having a brake drum thereon, comprising brake shoes embracing the drum, spring means normally urging said shoes into engagement with said drum, a lever pivoted intermediate the ends of said shoes and having oppositely disposed rollers engaging the shoe ends, an actuating rod extending laterally of said brake and connected to said lever, an actuator, a plunger controlled by said actuator, lever means connected between said plunger and rod for rotating said lever to spread said shoes apart upon energization of said actuator, and a shock absorber cushioning the action of said plunger on said lever means.

12. The combination of claim 11 wherein said actuator comprises a solenoid.

13. The combination of claim 11 wherein said actuator comprises a fluid operated piston.

14. In a rail car truck, a drive motor, a side frame member laterally spaced therefrom, a shaft on said motor paralleling said member, a brake drum on said shaft, brake shoes operatively arranged relative to said drum and having parallel end extensions, spring means normally tending to apply said shoes to said drum, means pivoted intermediate said extensions for spreading said shoes apart and including a laterally directed rod, and means for moving said rod longitudinally to actuate said spreading means disposed laterally of said drum on the opposite side of said frame member and supported therefrom.

15. In a rail car truck, a drive motor, a side frame member laterally spaced therefrom, a shaft on said motor paralleling said member, a brake drum on said shaft, brake shoes operatively arranged relative to said drum, spring means normally tending to apply said shoes to said drum, means for spreading said shoes apart, and actuating means for said spreading means disposed laterally of said drum on the opposite side of said frame member and supported therefrom, said actuating means including a motion transmitting rod extending transversely beneath said frame member between said spreading means and said actuating means.

16. The combination of claim 15 including means adjacent the actuating end of said rod for adjusting the same relative to said actuating means to control the movement of the spreading means upon energization of said actuating means.

17. In a rail car truck, a drive motor, a shaft on said motor, a brake drum on said shaft, brake shoes operatively arranged relative to said drum, spring means normally tending to apply said shoes to said drum, means for spreading said shoes apart, actuating means for said spreading means including a motion transmitting rod and an electrically operated armature, a crank interconnecting said rod and armature, and shock absorbing means having an arm connected to said crank for restraining rotation thereof.

18. In combination, a motor shaft having a brake drum secured thereon, a pair of brake shoes for said drum anchored on one side thereof and having parallel opposite end extensions, normally directed lugs adjacent the inner end of each extension, and channel means slidably receiving said lugs for maintaining said shoes in the plane of said drum.

19. In combination, a motor shaft having a brake drum secured thereon, a pair of brake shoes for said drum anchored on one side thereof and having parallel opposite end extensions, a rod extending through said extensions, spring means on said rod bearing against said extensions to urge said shoes about said drum, a laterally removable key in one end of said rod forming a stop for the spring means, and an axially adjustable stop on the other end of said rod for varying the pressure of said spring means against said key being removable to release the pressure of the spring means against said extension.

20. In combination, a motor having an end plate, a motor shaft extending therethrough and having a brake drum thereon, an offset anchor boss on said plate in the plane of said drum, a leaf spring secured at its center to said boss and having longitudinally slotted end portions, a pair of brake shoes having adjacent ends thereof engaging said slotted ends, means for clamping said shoe ends in adjusted positions on said spring ends, means at the opposite ends of said shoes normally urging them about said drum, and means for spreading said opposite shoe ends apart.

21. The combination of claim 20 wherein said opposite shoe ends have lug portions projecting toward each other, and means secured to said end plate slidably receiving said lug portions for maintaining said shoes in the plane of said drum.

22. The combination of claim 20 further characterized by the provision of means between said end plate and said opposite shoe ends maintaining said shoes in the plane of said drum.

23. The combination, with a motor shaft brake assembly including a pair of brake shoes and a motion transmitting rod operable to spread said shoes away from each other, of actuating means having a projecting actuating arm, a bell crank connected between said arm and rod for shifting said rod longitudinally upon operation of said actuating means, a shock absorber mounted on said means and having a projecting crank arm, and means connecting said crank arm to said bell crank to cushion the movement thereof.

24. In combination, a brake actuating rod for spreading a pair of normally engaged brake shoes away from a motor shaft brake drum, an actuator for said rod, a bell crank lever interconnecting said actuator and said rod for shifting said rod longitudinally in response to reciprocation of said actuator, shock absorbing means restraining rotation of said lever throughout its range of movement, and adjusting means on said rod providing for predetermined lost motion connection between said bell crank lever and said rod.

ALFRED O. WILLIAMS.